United States Patent [12]
Angiuoli et al.

(10) Patent No.: US 12,444,483 B2
(45) Date of Patent: Oct. 14, 2025

(54) QUALIFICATION OF SEQUENCING INSTRUMENTS AND REAGENTS FOR USE IN MOLECULAR DIAGNOSTIC METHODS

(71) Applicant: PERSONAL GENOME DIAGNOSTICS INC., Baltimore, MD (US)

(72) Inventors: Samuel V. Angiuoli, Baltimore, MD (US); David Riley, Baltimore, MD (US)

(73) Assignee: PERSONAL GENOME DIAGNOSTICS INC., Baltimore, MD (US)

( * ) Notice: Subject to any disclaimer, the term of this patent is extended or adjusted under 35 U.S.C. 154(b) by 1545 days.

(21) Appl. No.: 16/735,517

(22) Filed: Jan. 6, 2020

(65) Prior Publication Data
US 2020/0219594 A1 Jul. 9, 2020

Related U.S. Application Data

(60) Provisional application No. 62/845,564, filed on May 9, 2019, provisional application No. 62/789,421, filed on Jan. 7, 2019.

(51) Int. Cl.
*G16H 10/40* (2018.01)
*G01N 35/00* (2006.01)

(52) U.S. Cl.
CPC ....... *G16H 10/40* (2018.01); *G01N 35/00712* (2013.01); *G01N 35/00871* (2013.01); *G01N 2035/00673* (2013.01)

(58) Field of Classification Search
CPC ............. G16H 10/40; G01N 35/00623; G01N 35/00712; G01N 2035/00673
See application file for complete search history.

(56) References Cited

U.S. PATENT DOCUMENTS

| 6,270,961 B1 | 8/2001 | Drmanac |
| 8,719,053 B2 * | 5/2014 | Showalter .............. G16H 10/40 705/2 |

(Continued)

FOREIGN PATENT DOCUMENTS

| CN | 101652780 A | 2/2010 |
| CN | 103885898 A | 6/2014 |

(Continued)

OTHER PUBLICATIONS

Ewing et al., Base-Calling of Automated Sequencer Traces Using Phred—Error Probabilities, Genome Research 8: 186-194, 1998 ( Year: 1998).*

(Continued)

*Primary Examiner* — Jesse P Frumkin
*Assistant Examiner* — Theodore Charles Striegel
(74) *Attorney, Agent, or Firm* — Kilpatrick Townsend & Stockton LLP

(57) ABSTRACT

Presented herein are techniques for qualifying, checking and monitoring the use of diagnostic apparatuses and reagents, such as sequencing apparatuses and reagents, to ensure performance and quality of diagnostic methods. In one aspect, a system is provided for determining whether a sequencing run is a qualification run. The system includes a memory configured to store identifiers of sequencing apparatuses and an associated status, a network interface configured to communicate with a sequencing apparatus and a client terminal, and a processor configured to receive a report from the sequencing apparatus via the network interface for a sequencing run, and determine whether the sequencing run is designated as a qualification run.

21 Claims, 7 Drawing Sheets

(56) References Cited

U.S. PATENT DOCUMENTS

| | | | |
|---|---|---|---|
| 9,778,273 B2* | 10/2017 | Feingold | G01N 1/312 |
| 9,953,141 B2* | 4/2018 | Scott | G16H 10/40 |
| 10,521,805 B2* | 12/2019 | Yurach | G06Q 30/018 |
| 2006/0265133 A1 | 11/2006 | Cocks et al. | |
| 2009/0119047 A1* | 5/2009 | Zelin | G01N 27/3274 |
| | | | 702/82 |
| 2011/0276346 A1* | 11/2011 | Reiner | G16H 40/20 |
| | | | 705/2 |
| 2014/0032125 A1 | 1/2014 | Hawkins | |
| 2014/0180601 A1 | 6/2014 | Frank | |
| 2015/0236849 A1 | 8/2015 | Ayday et al. | |
| 2016/0197801 A1 | 7/2016 | Thirumalai et al. | |

FOREIGN PATENT DOCUMENTS

| | | | |
|---|---|---|---|
| CN | 106951731 A | 7/2017 | |
| DE | 102012014922 A1 | 1/2014 | |
| EP | 2746976 A1 * | 6/2014 | G16B 99/00 |
| JP | 10311837 A | 11/1998 | |
| KR | 20080036031 A | 4/2008 | |
| WO | WO 2012/174077 A1 | 12/2012 | |

OTHER PUBLICATIONS

International Search Report issued on Mar. 25, 2020, regarding PCT/US2020/012354.
CN Application No. 202080010167.X , "Notice of Decision to Grant", Jan. 6, 2024, 6 pages.
CN Application No. 202080010167.X , "Office Action", Jun. 29, 2023, 13 pages.
EP Application No. 20738077.5 , "Extended European Search Report", Sep. 6, 2022, 13 pages.
JP Application No. 2021-539422 , "Office Action", May 13, 2024, 5 pages.
JP Application No. 2021-539422 , "Office Action", Dec. 18, 2023, 6 pages.

* cited by examiner

QUALIFICATION OF SEQUENCING INSTRUMENTS AND REAGENTS FOR USE IN MOLECULAR DIAGNOSTIC METHODS

CROSS-REFERENCE TO RELATED APPLICATIONS

This application claims benefit of priority under 35 U.S.C. § 119(e) of U.S. Ser. No. 62/789,421, filed Jan. 7, 2019, and U.S. Ser. No. 62/845,564 filed May 9, 2019 the entire disclosure of both are considered part of and are incorporated by reference in the disclosure of this application in their entireties.

BACKGROUND OF THE DISCLOSURE

Field of the Disclosure

This disclosure relates to genetic analysis and more specifically to a system, methods and programs for qualifying, checking and monitoring the use of diagnostic apparatuses and reagents, such as sequencing apparatuses and reagents, to ensure performance and quality of diagnostic methods.

Background Information

Clinical diagnostic tests continue to become an ever more essential part of health care. Particularly in the area of in vitro diagnostics (IVD), breakthroughs in molecular diagnostics have opened up entirely new opportunities for diagnostics to drive medical decision-making and care.

IVD refers to tests for disease on samples that are removed from the body for analysis. There are a myriad of technologies currently in use to test for diseases that analyze a wide variety of biomarkers such as proteins, genes, enzymes, and other analytes that are indicative of disease.

The vast majority of diagnostic testing is conducted using diagnostic technologies in laboratory settings. Some of these technologies include, by way of illustration, immunoassays, molecular diagnostics, clinical chemistry, mass spectroscopy, proteomics, microbiome analysis, microbiology and hematology.

One particular type of molecular diagnostic technology includes use of sequencing apparatuses which run assays on DNA using one or more reagents. A report containing results of a sequencing run may be analyzed using a user generated analysis plan. This analysis may be used for a number of diagnostic purposes. However, the quality of sequencing apparatuses varies from apparatus to apparatus and may trend bad over time. Additionally, reagents also vary from lot-to-lot.

This phenomenon exists for instruments that are used for nearly all diagnostic technologies. As such, there exists a need to make sure that the equipment used to generate diagnostic reports meets quality standards needed for IVD to ensure accuracy of diagnosis.

SUMMARY OF THE DISCLOSURE

Accordingly, disclosed is a system and methods for qualifying a diagnostic apparatus and/or a reagent used by the diagnostic apparatus and preventing access to at least a diagnostic analysis report which is generated as a result of an analysis of a report from a diagnostic apparatus that was not qualified and/or using a reagent that was not qualified. Also disclosed are programs therefor.

In an aspect the disclosure provides a system and methods for qualifying a sequencing apparatus and/or a reagent used by the sequencing apparatus and preventing access to at least a diagnostic analysis report which is generated as a result of an analysis of a report from a sequencing apparatus that was not qualified and/or using a reagent that was not qualified. Other reports such as a complete run report which is generated from a report from a sequencing apparatus for a sequencing run may also be held. Also disclosed are programs therefor.

In an aspect of the disclosure, the system comprises a memory, a network interface and a processor. The memory is configured to store identifiers of sequencing apparatuses and an associated status, identifiers of reagents and an associated status and identifiers of approved software. The status may include qualified or unqualified. The status for a reagent may also be expired. The status for the sequencing apparatus may also be qualification expired. Both the reagent and the sequencing apparatus may have a status of not tested.

The network interface is configured to communicate with a sequencing apparatus and a client terminal.

The processor is configured to receive a report for a sequencing run from the sequencing apparatus via the network interface and determine whether a sequencing run is designated as a qualification run.

The report may comprises an identifier of the sequencing apparatus that generated the report, an identifier of a reagent used in a sequencing run, an identifier of software installed in the sequencing apparatus, and a result of the sequencing run.

When it is determined that the sequencing run is designated as a qualification run, the processor is further configured to determine whether the software installed in the sequencing apparatus is approved software, examine the result of the sequencing run to determine whether the sequencing apparatus or the reagent is qualified and update the associated status for at least one of the sequencing apparatus and the reagent in response to examination. When the software installed in the sequencing apparatus is not approved, the associated status for the sequencing apparatus is unqualified.

In an aspect of the disclosure, a sequencing run may be designated as a qualification run to qualify either a sequencing apparatus only; a reagent only; or both a sequencing apparatus and reagent.

The processor is further configured to determine whether an analysis that is requested for a sequencing run is in a diagnostic mode. When it is determined that the analysis is in the diagnostic mode, the processor is further configured to determine whether the software installed in the sequencing apparatus is approved software, determine whether the sequencing apparatus is qualified; and determine whether the reagent used in the sequencing run is qualified.

When the software installed in the sequencing apparatus is not approved or when at least one of the sequencing apparatus and the reagent is not qualified, the processor is configured to hold a diagnostic analysis report generated from the report in memory. The processor may also hold a complete run report generated for the sequencing run.

In an aspect of the disclosure, when at least one of the sequencing apparatus and the reagent is not qualified (or not tested), the processor is configured to disable a creation of an analysis plan in the diagnostic mode.

In an aspect of the disclosure, the processor is configured to enable access to the diagnostic analysis report by a client terminal when the software installed in the sequencing apparatus is approved and both the sequencing apparatus and the reagent are qualified.

In an aspect of the disclosure, the processor is further configured to change a status of a reagent to unqualified when a current date is after the expiration date for the reagent.

In an aspect of the disclosure, the processor is configured to change a status of the sequencing apparatus to qualification expired from qualified when a predetermined period of time expires from a time when the sequencing apparatus was qualified. Prior to expiration, the processor is configured to transmit a warning to the client terminal. The warning may be transmitted one week prior to the expiration.

In an aspect of the disclosure, previous held reports may be released by authorized users.

In an aspect of the disclosure, the processor is further configured to determine whether an analysis that is requested is in a research mode. When it is determined that the analysis is in the research mode, the processor is configured to enable access by the client terminal to a research analysis report generated by the processor, even if the sequencing apparatus is not qualified or the reagent used is not qualified.

In an aspect of the disclosure, the system further comprises a user interface displayable on a client terminal. The user interface may be web-based. The processor generated reports (when not held) may be accessed via the user interface.

DETAILED DESCRIPTION

While the detailed description illustrates a system utilizing sequencing apparatus(es) as the diagnostic apparatus, it will be understood that the system, methods and programs described herein may utilize a different type of diagnostic apparatus.

As used herein, a "diagnostic apparatus" may include any apparatus that may be used to conduct a diagnostic test, such as those performed in a clinical research environment. Such tests may include immunoassays, clinical chemistry assays, and/or molecular diagnostic assays. As such, in embodiments, a diagnostic apparatus may be capable of performing an immunoassay which includes for example, enzyme-linked immunosorbent assays (ELISAs), chemiluminescence immunoassays, fluorescence immunoassays, colorimetric immunoassays, radioimmunoassay, rapid tests, western blotting and/or enzyme-linked immunospot assays. In some embodiments, a diagnostic apparatus may be capable of performing a clinical chemistry assay which includes detection of an analyte, for example, processing of diagnostic panels including metabolic, electrolyte, liver, lipid, renal and/or thyroid function panels. In embodiments, a diagnostic apparatus may be capable of performing a molecular diagnostic assay which includes for example, polymerase chain reaction (PCR), isothermal nucleic acid amplification technology, microarray assays, hybridization assays, nucleic acid sequencing and next-generation nucleic acid sequencing and/or third generation nucleic acid sequencing. In embodiments, a diagnostic apparatus may be capable of performing a microbiology assay, hematology assay, coagulation assay, hemostasis assay and/or urinalysis assay. In embodiments, a diagnostic apparatus may be capable of performing mass spectroscopy, proteomics, microbiome analysis and/or tumor micro-environment analysis.

Further, in various embodiments, a diagnostic apparatus may be capable of performing a single diagnostic test or a combination of diagnostic tests. As such a diagnostic apparatus may be capable of conducting an immunoassay as well as a clinical chemistry assay. An example of an apparatus that is capable of performing multiple diagnostic tests is a hematology analyzer that may utilize electrical impedance (resistance) and then either flow cytometry and optical scatter, or fluorescent flow cytometry and a fluorescence detector, to count, distinguish, and evaluate red blood cells (RBCs), white blood cells (WBCs), and platelets.

Accordingly, the disclosure provides a system, methods and programs that are configured to check, record, and qualify the use of a diagnostic apparatus and associated reagent, consumable, and/or disposable components to ensure performance and quality so that it meets or exceeds standards of IVD use.

Figure 1:
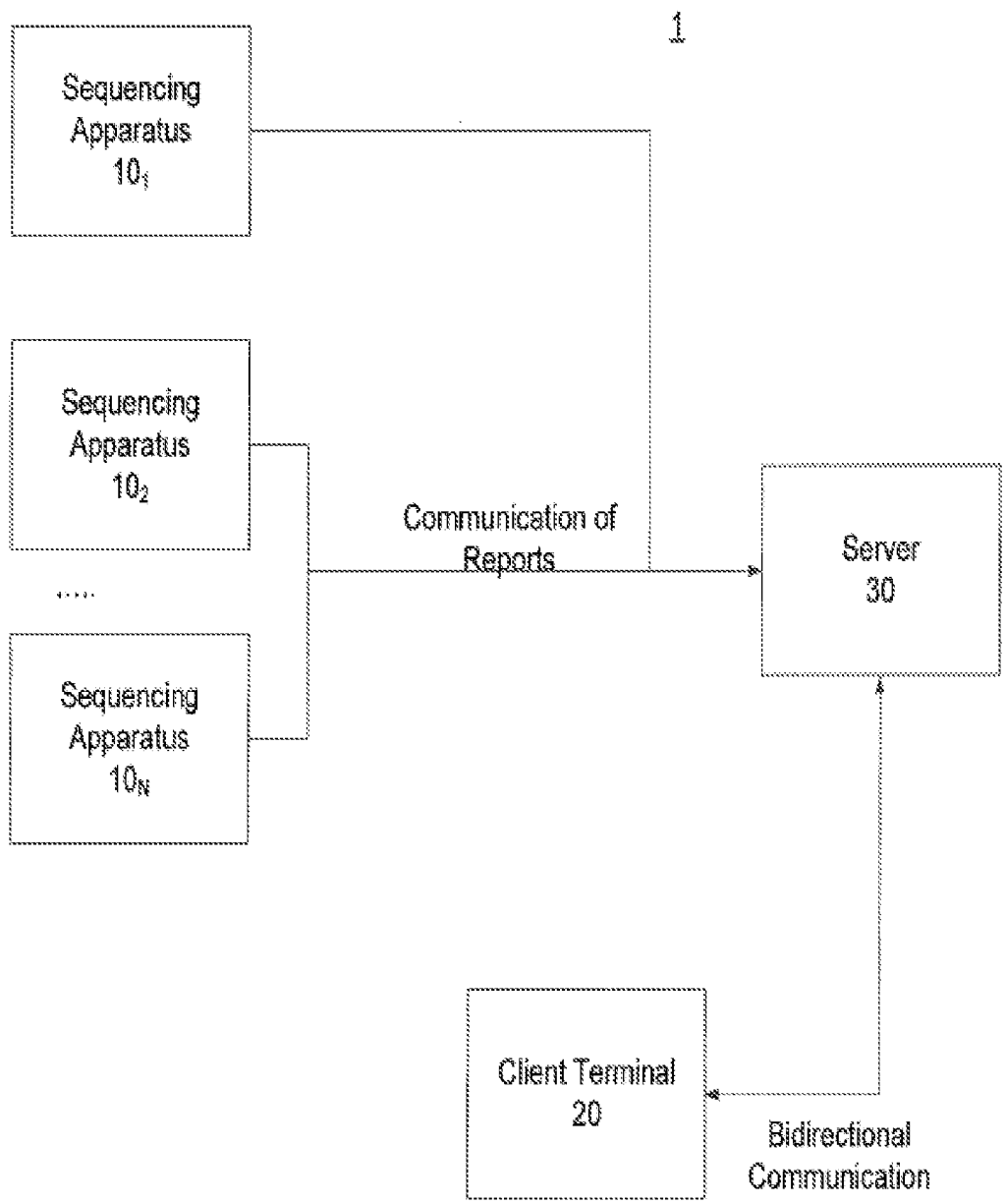
FIG. 1 is a block diagram of a system in accordance with aspects of the disclosure.

FIG. 1 is a block diagram of a system 1 in accordance with aspects of the disclosure. The system 1 comprises a plurality of sequencing apparatuses $10_{1-N}$ (hereinafter "10"), a client terminal 20 and a server 30. The client terminal 20 is capable of communicating with the server 30. In an aspect of the disclosure, the communication may be via a wireless network such as a local area network (LAN).

The client terminal 20 may comprise a web browser for accessing a user interface (web-based UI) for communicating with the server 30. The user interface is used at least to specify an analysis plan for a sequence run, set a sequence run as a qualification run to qualify a sequencing apparatus 10 and/or a reagent (among other features) and view or obtain server analysis reports. The user interface will be described later. In an aspect of the disclosure, the client terminal 20 communicates with the server 30 via the Internet. However, in other aspects of the disclosure, an application program may be downloaded locally on the client terminal 20 and the user interface may be stored locally. The client terminal 20 may be a portable terminal such as a laptop or cellular telephone (smartphone) or the like or may be a desktop computer.

The sequencing apparatuses 10 are configured to run assays. The sequencing apparatuses 10 may be off-the-shelf sequencing instruments. For example, the sequencing apparatuses may be commercially available instruments from Illumina®. A sequencing apparatus 10 may be configured for diagnostic or research (depending on the model).

Each sequencing apparatus 10 comprises a plurality of software (software packages). This software may be preinstalled. Alternatively, the software may be updated. The software is identified by an identifier with a version number.

After a sequence run (also referred to as a run or a sequencing run) is executed on a sequencing apparatus 10, the sequencing apparatus 10 generates a sequencing apparatus report and transmits the same to the server 30. In an aspect of the disclosure, each sequencing apparatus 10 communicates with the server 30 via a wireless network, such as a LAN. The sequencing apparatus report comprises information regarding the run information. The run information may comprise an identifier of the sequencing apparatus, identifier of software installed, a date of the run and report including at least a start date and time, lot number(s) of reagent(s) used in the run, an unique identifier of the run and the results of the run. The results of the run may include a quality score, such as, but not limited to a Q30 score. The sequence apparatus run report may include other information not specifically identified herein.

The term reagent includes a reagent kit, a flow cell and a PR2 bottle. Each reagent is identified by a lot number.

The server 30 communicates with the client terminal 20. This communication is bidirectional, meaning that the server 30 may receive information from the client terminal 20 and transmit information to the client terminal 20.

Figure 2:
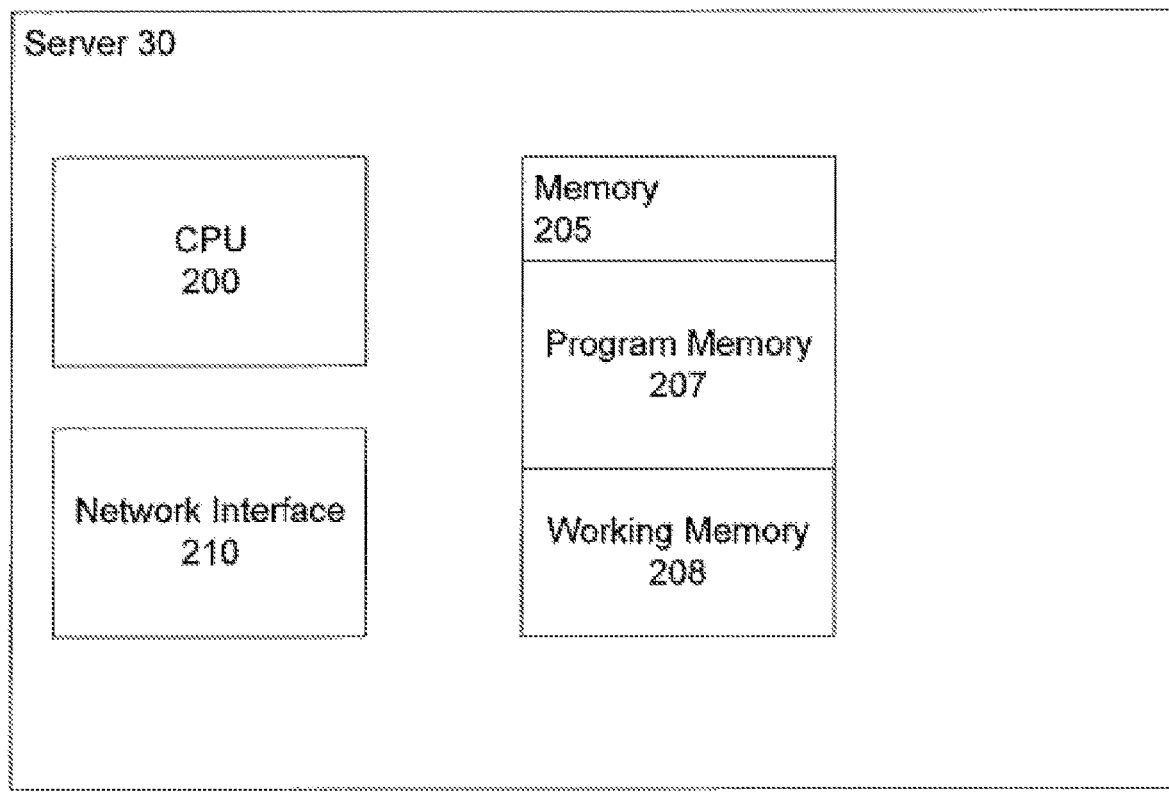
FIG. 2 is a block diagram of a server in accordance with aspects of the disclosure.

FIG. 2 is a block diagram of the server 30. The server 30 comprises a CPU 200, a memory 205 and a network interface 210.

The memory 205 comprises program memory 207 and working memory 208. The CPU 200 is configured to execute programs (also described herein as modules or instructions) stored in the program memory 207 to perform the functionality described herein. The memory 205 may be, but not limited to, RAM, ROM and persistent storage. The memory 205 is any piece of hardware that is capable of storing information, such as, for example without limitation, data, programs, instructions, program code, and/or other suitable information, either on a temporary basis and/or a permanent basis.

Although, FIG. 2 depicts a CPU 200, the server 30 may comprise other types of processors such as a GPU. In other aspects of the disclosure, instead of or in addition to a CPU 200 executing instructions that are programmed in the program memory 207, the processor may be an ASIC, analog circuit or other functional logic, such as a FPGA, PAL or PLA.

Figure 3:
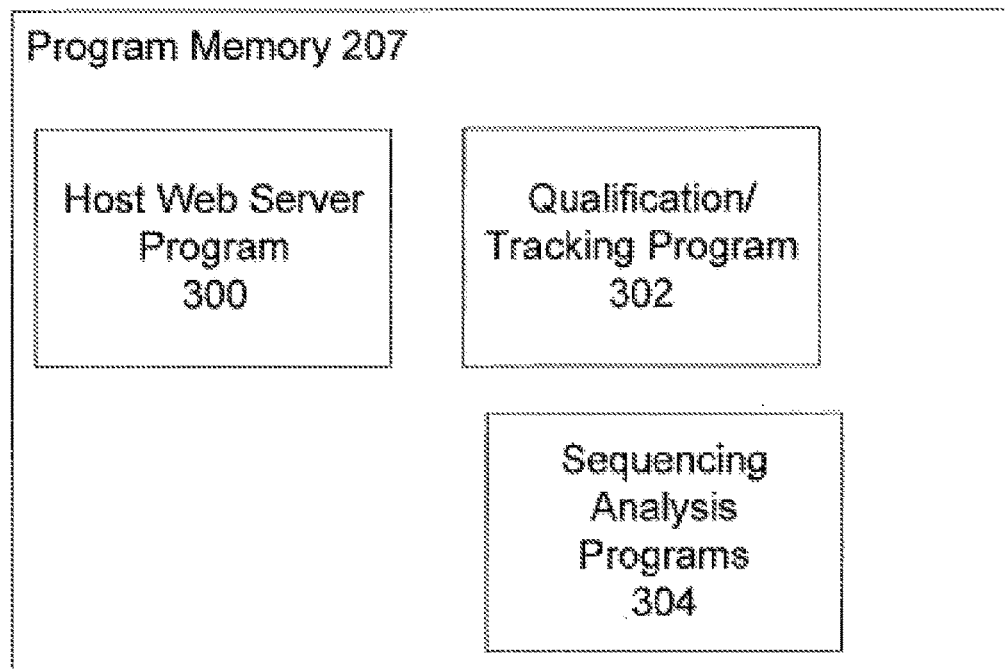
FIG. 3 is a block diagram of program memory in accordance with aspects of the disclosure.
Figure 4:
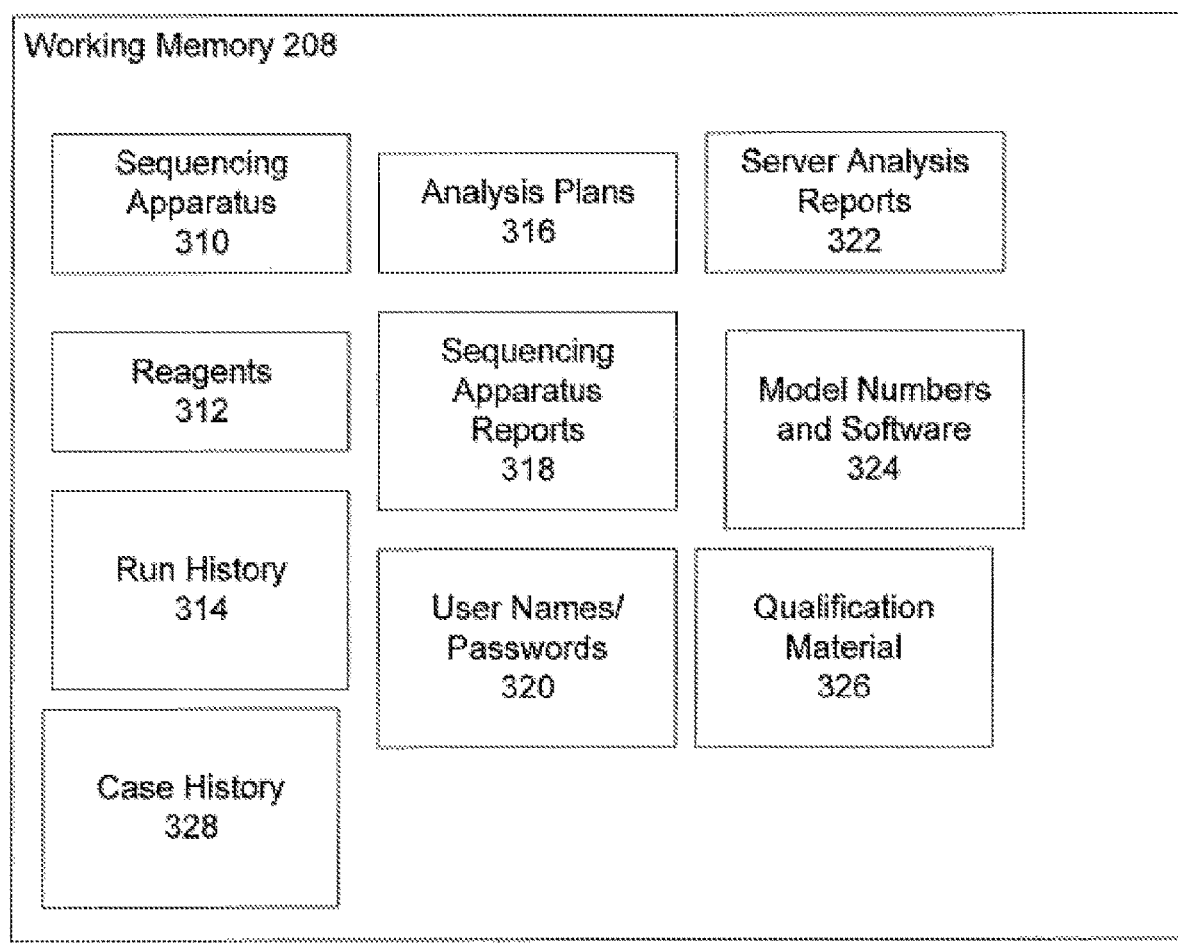
FIG. 4 is a block diagram of working memory in accordance with aspects of the disclosure.
Figure 5:
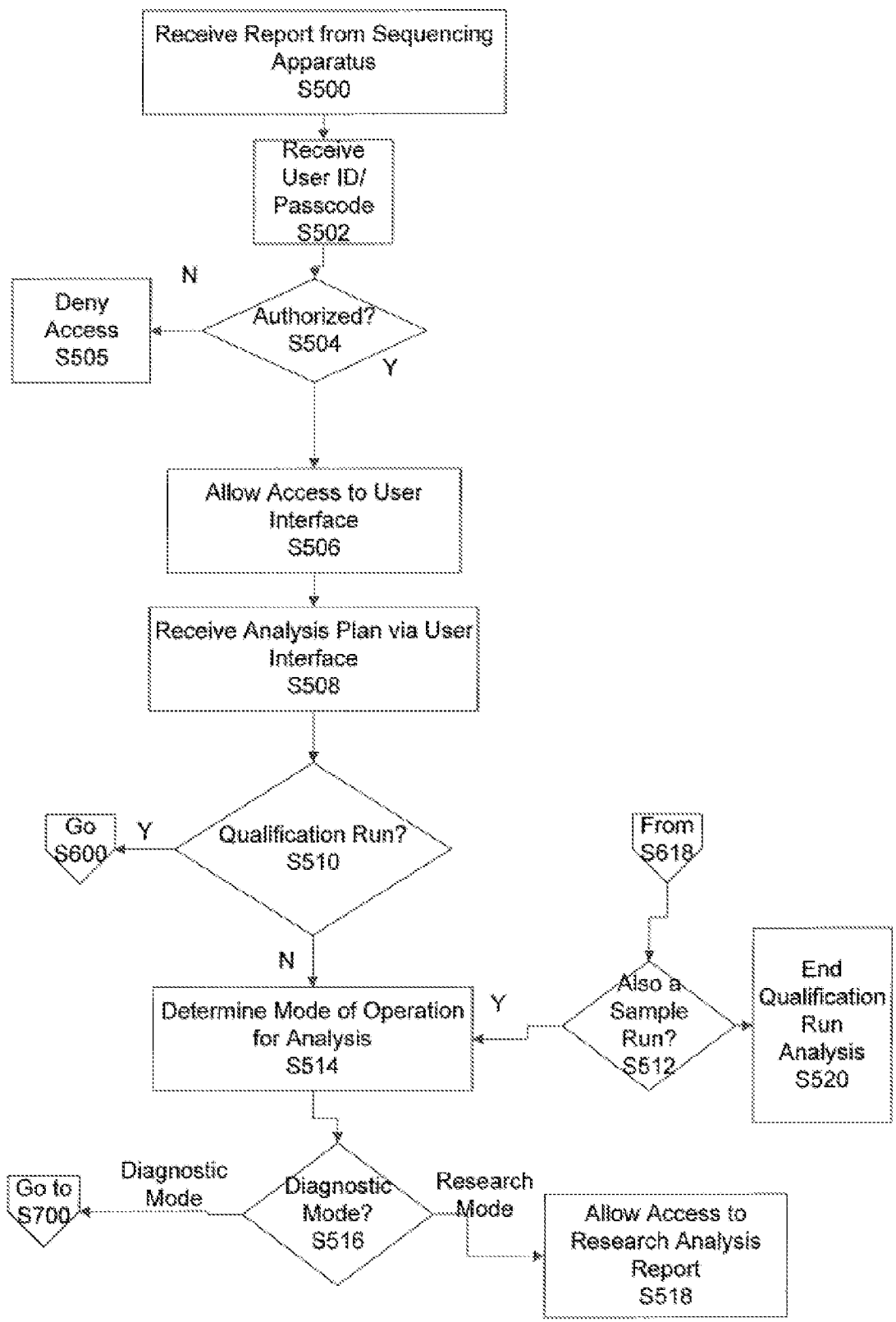
FIGS. 5-8 are flow charts of methods for qualifying, checking and monitoring the use of sequencing apparatuses and reagents in accordance with aspects of the disclosure.

The program memory 207 (as depicted in FIG. 3) may have one or more programs. For example, the program memory 207 may have a sequencing analysis program(s) 304. The sequencing analysis program(s) 304 may contain instructions for causing the CPU 200 to execute an analysis plan on a sequencing apparatus report received from a sequencing apparatus 10.

The sequencing analysis program(s) 304 may also contain instructions for causing a web-based UI to be displayed on the client terminal 30. For example, this web-based UI includes a login in screen for accepting a user identifier and passcode. In an aspect of the disclosure, the login in screen allows the user to select different system modes (e.g., analysis modes). For example, the modes include at least a diagnostic mode and a research mode. In other aspects of the disclosure, the modes may also include an investigation mode. In accordance with these aspects, the server may treat the investigation mode in a similar manner as the diagnostic mode.

The web-based UI includes a screen for creating the analysis plan in the different modes. An analysis plan for the different modes is different.

The software module for the web-based UI may be separate from a software module for executing the analysis plan. In other aspects of the disclosure, the modules may be integrated into a single platform.

The program memory 207 further comprises a qualification/tracking program 302. The qualification/tracking program 20 contains instructions for execution by the CPU 200.

The instructions cause the server 30 to display additional web-based UI on the client terminal 20, determine whether a sequencing apparatus 10 is qualified, determine whether a reagent is qualified and control access to server analysis reports and update status of the sequencing apparatus and reagents as needed.

A software module for the web-based UI may be separate from a software module for determining whether a sequencing apparatus 10 is qualified, determining whether a reagent is qualified and controlling access to server analysis reports and updating status of the sequencing apparatus and reagents as needed.

Additionally, the qualification/tracking program 302 and the sequencing analysis programs 304 may be integrated into a platform.

The qualification/tracking program 302 has instructions for generated a web-based UI for the sequencing apparatuses, the reagents, analysis plans, sequencing runs and cases.

For example, the web-based UI for the sequencing apparatuses may include a list of sequencing apparatuses (identifiers) and an associated status. The status may be unqualified, qualified and qualification expired. Qualification expired means that the sequencing apparatus was qualified, however, a set period of time past since the sequencing apparatus was qualified. In another aspect of the disclosure, a status may include not tested. The status may be displayed differently such that the user may recognize the differences in status. In an aspect of the disclosure, a different color may be used for the different statuses. For example, qualified may be displayed in green, e.g., the word qualified in green, unqualified or qualification expired may be displayed in red, e.g., the words unqualified or qualification expired in red. In another aspect of the disclosure, the identifier may be displayed in red or green, depending on the status.

In another aspect of the disclosure, the web-based UI may also include a time remaining until the qualification expires.

The list may be in a form of a table with column headings.

Another web-based UI for the sequencing apparatus may include information regarding its last run, e.g., timing of the last run. This UI may be in a form of a pop-up screen when a sequencing apparatus is selected from the web-based UI for the sequencing apparatuses.

In other aspects of the disclosure, another web-based UI for the sequencing apparatus may include a quality score for a qualification run.

The web-based UI for the reagents may include a list of the reagents (identified by lot number). The list may include the type of reagent such as Kit, flow cell and PR2 bottle and its associated status. The status may be unqualified and qualified. In other aspect of the disclosure, the web-based UI may also include the expiration date for the reagent and an indication that the reagent expired. Like for the sequencing apparatuses 10, the reagent status may be displayed differently such that the user may recognize the differences in status. In an aspect of the disclosure, a different color may be used for the different statuses. For example, qualified may be displayed in green, e.g., the word qualified in green, unqualified may be displayed in red, e.g., the word unqualified in red. In another aspect of the disclosure, the identifier may be displayed in red or green, depending on the status. In another aspect of the disclosure, an expired lot may be identified with the word expired in specific color, such as, but not limited to red.

The list may be in a form of a table with column headings.

Another web-based UI for the reagent may include the date of qualification and the quality score for a qualification run.

The web-based UI for the Run Level server analysis reports (also referred to herein as analysis plan reports) may include the plan name, description and start date for the sequencing run. In an aspect of the disclosure, the web-based UI will also have an indication whether a complete run report is held (the complete run record is generated by the server 30 for the sequencing run). For example, the indication may be a color or a specific wording. In another aspect of the disclosure, a reason why a complete run report is held may be included. The reason may indicate that a sequencing apparatus or reagent was not qualified at the time of the sequencing run or the reagent used is expired.

A web-based UI may be displayed for cases. This web-based UI may include a case number, the start date for the sequencing run, plan name, and the assay name. In other aspects, the web-based UI may also include names of test sample(s) used. A sequencing run may have multiple cases. In an aspect of the disclosure, for each test sample in the sequencing run, there is a separate case. In other aspects of the disclosure, multiple test samples (from a sequencing run) may be included in a single case. In an aspect of the disclosure, the web-based UI will also have an indication whether a Diagnostic Analysis Report is held (Diagnostic Analysis Report is generated by the server 30 for each test sample (case) included in the analysis plan).

The web-based UI for the runs may include an identifier of the run, a start date and time of the run, the status (sequenced or fail) and whether the run is a qualification run. In an aspect of the disclosure, if the run is a qualification run, the web-based UI may also have an indication of the status of the qualification run (e.g., passed or fail). In another aspect of the disclosure, the quality score for the run may be included in the web-based UI.

In an aspect of the disclosure, the web-based UI for the runs may also include a selection tool for selecting a run as a qualification run. The selection tool may be a checkbox, button or a slide switch. The slide switch may be configured to move, e.g., from a first position to a second position indicating the selection of the run as a qualification run.

In an aspect of the disclosure, another web-based UI may be displayed when a run is selected as a qualification run. This web-based UI may include another selection tool for identifying what is being qualified, such as sequencing apparatus only, reagent only or both sequencing apparatus and reagent. The selection tool may be a radio dial, multiple check boxes or multiple buttons. This web-based UI may be displayed as a pop-up window (also referred to herein as pop-up).

In another aspect of the disclosure, another web-based UI may be displayed when a run is selected as a qualification run. This web-based UI may be an alert or warning confirming that the user wants to proceed with the run as a qualification run. For example, the web-based UI may be a pop-up window. The pop-up window might read "marking this run as a qualification run will perform analysis that will mark the sequencer and reagents lots as qualified or unqualified. Assays that are run on unqualified sequencers or using unqualified reagents lots will have their reports held. Are you sure you wish to proceed" (sequencer may be replaced with sequencing apparatus). Other wording may be use and the wording is not limited to the example described herein.

In an aspect of the disclosure, only sequencing runs that had sequencing completed may be marked or designated as a qualification run. Failed sequencing runs may not be marked as a qualification run.

In another aspect of the disclosure, another web-based UI may be displayed when a run is selected as a qualification run. This web-based UI may only be displayed when an administrator is logged in. An administrator may unselect a run as a qualification run. The administrator may unselect a run by using the selection tool in a similar manner as described above. The web-based UI may be a pop-up window as an alert or warning to confirm that the administrator wants to unselect the run. For example, the pop-up might read "unmarking this run as a qualification run will potentially change what sequencers and reagent lots are marked as qualified. Are you sure you wish to proceed?" (sequencer may be replaced with sequencing apparatus). Other wording may be use and the wording is not limited to the example described herein.

In an aspect of the disclosure, the types of web-based UI may be accessible via different tabs or buttons on a main web-based UI. In other aspects of the disclosure, the types of web-based UI may be separate UIs.

In an aspect of the disclosure, the listings in each web-based UI may be from most recent to oldest. For example, the web-based UI for sequencing runs may list the most recent sequencing run first and oldest last.

The program memory 207 may also include a host web server program 300, which enables the server to accept and respond to HTTP requests.

The working memory 208 contains information used by the qualification/tracking program 302 and the sequencing analysis program(s) 304.

The working memory 208 comprises model numbers and software 324 which is approved to be used. The model number is for the sequencing apparatus 10. The model number is manufacturer specific. The software is a type of software that is installed in the sequencing apparatus 10 including a version number. This software can include the sequencing instrument control software and primary analysis software. The model numbers and software 324 may be input into the server 30 by an authorized user such as an authorized technician, the installer of the system or a system administrator. In an aspect of the disclosure, the model numbers and software 324 is input prior to installation of the system 1 and prior to the system being put into use. In other aspects of the disclosure, the model numbers and software 324 is input into the server 30 at the time of installation, during a configuration stage. As needed, additional model numbers and software 324 may be added via an update by the authorized user, as new models become available from a manufacturer or as new software and software versions are created. In an aspect of the disclosure, adding model numbers and software requires authentication via a user name and passcode.

The model numbers and software 324 which is stored in the server 30 is subsequently used to determine whether a sequencing apparatus 10 which generated a sequencing apparatus report has approved software installed and is an approved model.

The working memory 208 also comprises an identifier of material which is approved to be used for qualifying either the sequencing apparatus 10 and/or reagents (referred to herein as qualification material 326). In an aspect of the disclosure, the qualification material 326 is a diverse sequence material derived from a bacteriophase source manufactured with adapters. The qualification material 326 is used to track sequencing metrics when pooled with other controls/samples.

Like the model numbers and software 324, the qualification material 326 may be input into the server 30 by an authorized user such as an authorized technician, the installer of the system or a system administrator prior to installation or during installation.

The identifier of the qualification material which is stored in the server is subsequently used to determine whether a run selected as a qualification run used the appropriate qualification material.

The working memory 208 also comprises information regarding the sequencing apparatus (e.g., referenced herein as "310"). In an aspect of the disclosure, an identifier of the sequencing apparatus 10 may be input manually at the time of installation by an authorized user, e.g., registering the sequencing apparatus 10 with the server 30. The information regarding the sequencing apparatus (e.g., 310) may include the identifier of the sequencing apparatus, its qualification status, date of qualification, date of expiration of the qualification and time to warn that the expiration is near. In other aspects of the disclosure, the information 310 may also include a last run date and time. When a sequencing apparatus 10 is initially registered, the qualification status is set to unqualified or not tested and a last run date and time is unpopulated. In an aspect of the disclosure, the information may also include a quality score for a qualification run.

Each time a new sequencing apparatus 10 is added to the system 1, the sequencing apparatus is registered and information is added in the working memory (information 310). In other aspects of the disclosure, the identifier of a sequencing apparatus may be added via a wireless identification reader such as a bar code reader.

In other aspects of the disclosure, the identifier of a sequencing apparatus is added when a sequencing apparatus report is received from the sequencing apparatus 10. In this case, the sequencing apparatus 10 is not pre-registered.

In an aspect of the disclosure, each sequencing apparatus 10 has its own record in the working memory 208. In other aspects of the disclosure, all of the sequencing apparatuses are maintained as a list. The information may be contained in a table.

The information in the working memory 208 for the sequencing apparatus (e.g., 310) is used by the server 30 to generate the above described web-based UI for the sequencing apparatuses, determine whether a sequencing apparatus is qualified when the sequencing apparatus executes the sequencing run, determine whether a qualification is expired and when to issue a warning that the qualification is expiring. As needed, the server 30 updates the status information, e.g., from unqualified to qualified and vice versa (and qualified to qualification expired) based on the qualification run. A most recent qualification run governs the status.

The working memory 208 also comprises information regarding the reagents (e.g., 312). In an aspect of the disclosure, certain information regarding the reagent may be input manually by an authorized user. For example, an authorized user may input a lot number (identifier), a type of the reagent and an expiration date of the reagent. In an aspect of the disclosure, the information regarding the reagents 312 may include its qualification status including unqualified, qualified and not tested. When a reagent is initially registered, the qualification status is set to unqualified or not tested. In an aspect of the disclosure, the information 312 may also include a quality score for the qualification run having the reagent. In other aspects of the disclosure, the qualification date is included in the information 312. The quality score, qualification status and qualification date is automatically entered by the server 30.

Each time a new reagent is added to the system 1, the reagent is registered and information is added in the working memory (information 312). In other aspects of the disclosure, the lot number of a reagent, type and expiration date may be added via a wireless identification reader such as a bar code reader.

In other aspects of the disclosure, the lot number of a reagent, type and expiration date is added when a sequencing apparatus report is received from a sequencing apparatus 10. In this case, the reagent is not pre-registered.

In an aspect of the disclosure, each reagent has its own record in the working memory 208. In other aspects of the disclosure, all of reagents are maintained as a list. The information may be contained in a table.

The information in the working memory 208 for the reagents (e.g., 312) is used by the server 30 to generate the above described web-based UI for the reagents, determine whether a reagent is qualified when a sequencing run is executed by the sequencing apparatus 10 and determine whether the reagent is expired. As needed, the server 30 updates the status information, e.g., from unqualified to qualified and vice versa (and qualified to qualification expired) based on the qualification run. A most recent qualification run governs the status.

The working memory 208 also comprises sequencing apparatus reports 318. The sequencing apparatus reports 318 are the reports which are received from the sequencing apparatus 10. In addition to the information described above, the sequencing apparatus report may also include an indication whether the sequencing was complete or failed. A sequencing apparatus report 318 may be stored in the working memory 208 for a preset period of time. The preset period of time may be based on the size of the working memory 208.

The information in the sequencing apparatus reports is subsequently used to determine whether the sequencing apparatus 10 and reagents are qualified (by comparing with information in the report with information in the sequencing apparatus and reagents areas (310 and 312, respectively) in the working memory 208).

The working memory 208 also comprises run history 314. A record is maintained for each sequencing run, e.g., each sequencing apparatus report. The run history 314 is generated from the sequencing apparatus report 318 and information input via a web-based UI at the client terminal 20. For example, for each run, the history may include the unique identifier for the run, a start day and time for the run on the sequencing apparatus, an identifier of the sequencing apparatus and whether the sequencing was completed or failed. This information is automatically populated by the server 30 from the sequencing apparatus report 318.

In an aspect of the disclosure, the run history 314 may further include whether the run was selected as a qualification run and if so, whether the qualification pass or failed. In an aspect of the disclosure, the information regarding a qualification run includes whether the run was selected to qualify the sequencing apparatus only, the reagents only or both the sequencing apparatus and the reagents. In another aspect of the disclosure, the run history 314 may include information whether the sequencing run was executed on an unqualified sequencing apparatus or using unqualified reagents. In other aspects of the disclosure, the run history 314 may further include a quality score. In other aspects of the disclosure, the run history 314 may further include the expiration date for the reagents. In an aspect of the disclosure, the run history may include the complete run report.

The run history 314 may be used by the server 30 to generate certain of the above described web-based UI.

The working memory 208 also comprises cases history 328. The cases history includes all cases analyzed on the server 30 since installation. The case history may also include case reports such as the diagnostic analysis report and the research analysis report. The cases history 328 stored in the working memory 208 is used by the server 30 to generate certain of the above described web-based UI.

The working memory 208 also comprises the analysis plans 316. The analysis plans 316 are created by a user at the client terminal 20 using a web-based UI. Once a user logs in, the user may create the analysis plan 316. The type of analysis may be determined by the mode of log in, e.g., diagnostic verse research. In diagnostic mode, the user may create a plan for a diagnostic analysis and in research mode, the user may create a plan for a research analysis. In other aspects of the disclosure, the user may designate the mode, e.g., diagnostic mode or research mode in the analysis plan.

The analysis plan 316 includes an identifier of the assay, a sequencing run (unique identifier), a plan name and a plan description. The analysis plan 316 also may include samples (and sample type such as external control and specimen). The analysis plan 316, stored in the working memory 208, is used by the server 30 to generate certain of the above described web-based UI.

The working memory 208 also comprises server analysis reports 322. The server analysis reports 322 are the reports generated by the server 30 using the sequencing analysis programs 304 based on the user defined analysis plan 316 for a sequencing run (using the data in the sequencing apparatus report 318 stored in the working memory 208). The server analysis reports 322 include complete run report (a run level report), a diagnostic analysis report when in a diagnostic mode (case level report) and a research analysis report when in research mode (case level report). In an aspect of the disclosure, the server 30 may generates an analysis report for a qualification run where an analysis plan is also generated.

In accordance with aspects of the disclosure, the server 30 (CPU 200 executing the qualification/tracking program 302) may hold/prevent access by any web-based UI to a diagnostic analysis report when the sequencing run (included in the report) was executed by an unqualified sequencing apparatus or where the sequencing run used reagents that were unqualified.

The working memory 208 also comprises user names/passcodes of registered users. There are different types of registered users based on usage rights. The system 1 has tiered or hierarchical rights. For example, an authorized server installer or server technician may have the most rights. These rights may include updating the approved sequencing models and software 324 and qualification material 326 and among other rights. An administrator may have a set of rights less than above. These rights may include releasing held/restricted diagnostic analysis reports, removing a run from a qualification run, changing a qualification period for a sequencing apparatus and changing a warning time. The rights may also include adding a sequencing apparatus 10 and a reagent, e.g., registration. A regular or normal user may have fewer rights which exclude the above-identified activities, but include viewing the web-based UI, selecting a sequencing run as a qualification run, reviewing released server analysis reports and creating an analysis plan.

The administrator and an authorized server installer or server technician have all of the rights of the regular or normal user.

FIGS. 5-8 are flow charts of methods for qualifying, checking and monitoring the use of sequencing apparatuses and reagents in accordance with aspects of the disclosure. The functions depicted in FIGS. 5-8 are performed by the server 30 (CPU 200) executing programs stored in the program memory 207. This description may use server 30 or CPU 200 when describing the function(s).

The functions may be executed in an order other than depicted in the figures and certain functions may be executed at the same time. For example, receiving a sequencing apparatus report 318 from the sequencing apparatus 10 may occur at the same time as a user logging in at S502. Also, an analysis plan may be created before, during or after a sequencing run. When the analysis plan is created before or during the sequencing run, the server identifies the analysis plan using the lot number of the reagent. When the analysis plan is created after the sequencing runs, the web-based UI will have a list of available sequencing runs. This list may be in the form of a dropdown window for selection of a sequencing run.

At S500, the server 30 receives the sequencing apparatus report 318 from the sequencing apparatus 10. The server 30 receives the report via a network interface 210 (which may be a wireless interface). The CPU 200 causes the report 318 to be stored in the working memory 208.

Prior to S502, the server 30 receives a request for a display of a web-based UI for logging into the system 1. The server 30 transmits the web-based UI to the client terminal 20 for display. At the client terminal 20, the user, using a web browser enters the URL for the server.

At S502, the server 30 receives the user ID and passcode which was entered by the user (via the network interface 210). The CPU 200 compares the received user ID and passcode with the User name and passcodes 320 stored in the working memory 208 to determine if there is an authorized access at S504. When there is no match ("N" at S504), the user is denied access to the system 1 at S505. The server 30 transmits a login failure message. When there is a match ("Y" at S504), the CPU 200 determines the associated rights, e.g., authorized installer, administrator or normal user. At S506, the CPU 200 causes a display of the web-based UI allowed for the particular type of user. In an aspect of the disclosure, when the user logs in, the user selects a specific mode (diagnostic or research), thus, in accordance with this aspect of the disclosure, S506 also include causing a display of the web-based UI for the selected mode. The web-based UI is transmitted by the network interface 210. As described above, the web-based UI are displayed using the information in the working memory 208. For example, a web-based UI for runs is displayed according to information in the run history 314. A web-based UI for the sequencing apparatuses is displayed according to information in the sequencing apparatus (310) and a web-based UI for the reagents is displayed according to information in the reagents 312.

As described above, a user may create an analysis plan 316 via a web-based UI and designate a sequencing run as a qualification run for a sequencing apparatus only, a reagent only or both a sequencing apparatus and the reagent. The sequencing run may be designated as a qualification run via the web-based UI for runs or in the analysis plan itself.

At S508, the server 30 receives the analysis plan 316 (with or without a qualification run designation). In an aspect of the disclosure, the server 30 may receive a separate designation for a qualification run. The CPU 200 causes the analysis plan 316 to be stored in the working memory 208. In an aspect of the disclosure, if the user designates a sequence run as a qualification run, an analysis plan 316 may not be received. In other aspects of the disclosure, an analysis plan 316 may be generated for a run designated as a qualification run, where the sequencing run also contained a sample in addition to the qualification material 326. When an analysis plan is created for a run designated as a qualification run, in an aspect of the disclosure, the analysis whether the sequencing apparatus and reagents are qualified may occur first.

At S510, the CPU 200 determines whether a sequencing run is designated as a qualification run, e.g., did the server 30 receive a designation from a web-based UI or does the analysis plan 316 indicate that the sequencing run is a qualification run.

Figure 6:
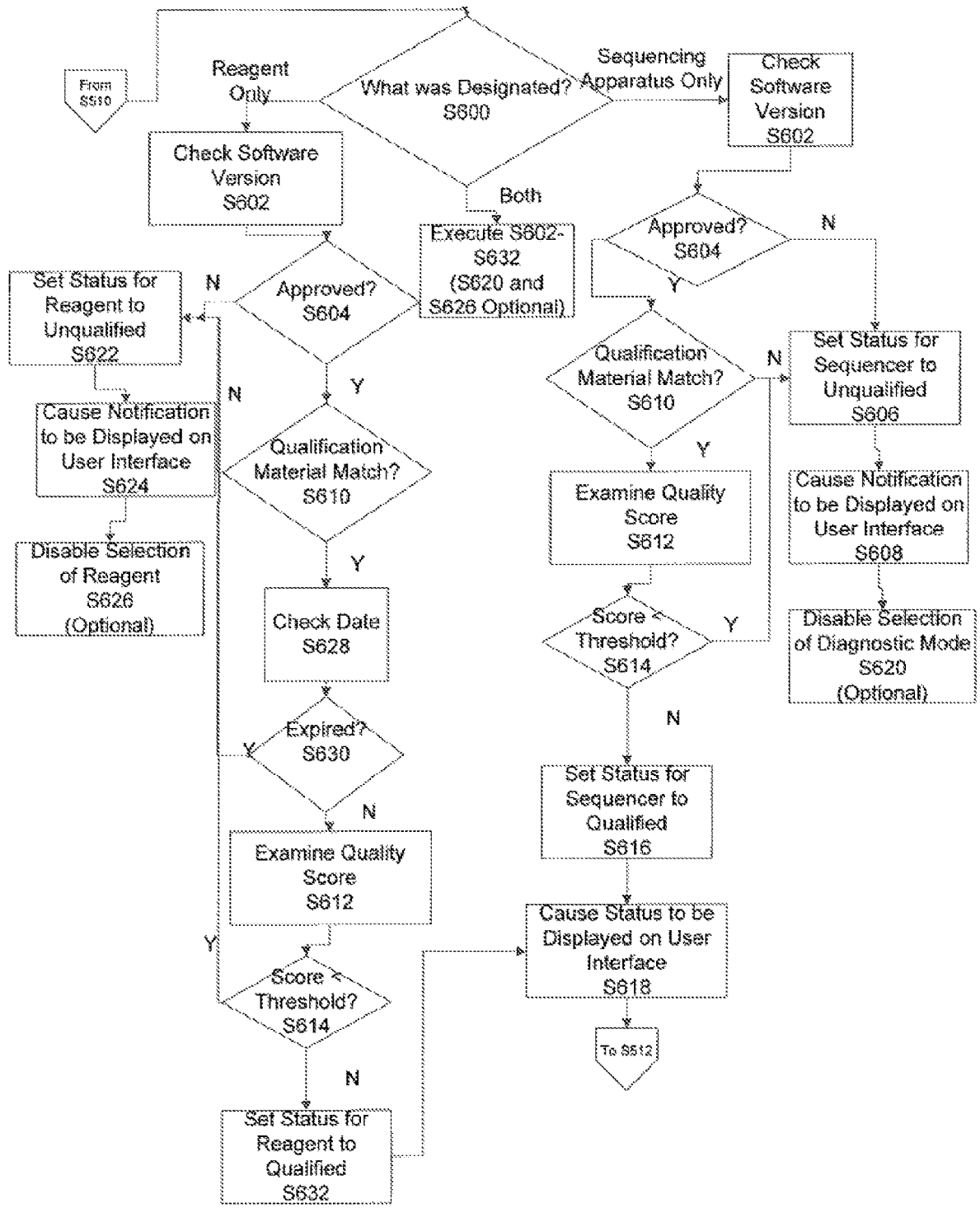

When the CPU 200 determines that the sequencing run is designated as a qualification run, S600 occurs. FIG. 6 illustrates the qualification analysis. At S600, the CPU 200 determines what the user designated for the qualification run, e.g., sequencing apparatus only, reagent only and both sequencing apparatus and reagent. In an aspect of the disclosure, a reagent may be qualified on a different sequencing apparatus and thus would not need to be qualified again. Additionally, in an aspect of the disclosure, the sequencing apparatus 10 may have been qualified using different reagents and thus would not need to be qualified again unless the qualification expired When the CPU 200 determines that the user designated the sequencing run for qualifying only the sequencing apparatus, the CPU 200 executes the analysis for the sequencing run only. The CPU 200 retrieves the sequencing apparatus report 318 for the sequencing run from the working memory 208. At S602, the CPU 200 identifies the model number and software (and versions) for the model and software (and versions) installed in the sequencing apparatus 10 that generated the report for the sequencing run. The CPU 200 also retrieves the model numbers and software 324 which is approved, also stored in the working memory 208. The CPU 200 compares the model number and software (and versions) installed in the sequencing apparatus with model numbers and software 324 which is approved (at S604) to determine whether the model and software (for the sequencing apparatus) is approved.

When the CPU 200 determines that the model number and/or the software (and versions) do not match with the approved information in the working memory ("N" at S604), the sequencing apparatus is not qualified and the status for the sequencing apparatus is set to unqualified (or maintained as unqualified) at S606. The CPU 200 updates the status information for the sequencing apparatus (stored in 310) to unqualified. The CPU 20 also updates the run history 614 for the sequencing run.

At S608, the CPU 200 causes a notification to be displayed on a web-based UI that the sequencing apparatus is unqualified. In an aspect of the disclosure, if the user is still logged into the system 1, the web-based UI is updated with the change in status. In an aspect of the disclosure, if the user has logged out of the system 1, a subsequent login would result in an updated web-based UI for the sequencing apparatus and the runs. In another aspect of the disclosure, a pop-up window may be displayed.

In an aspect of the disclosure, the CPU 200 may disable a selection of a diagnostic mode analysis at S620. This may occur when there is no qualified sequencing apparatuses $10_{1-N}$ in the system 1. In this aspect of the disclosure, when a user subsequently attempts to login to the system 1, the web-based UI for the login may not include a button for "diagnostic mode" (only). In other aspects of the disclosure, the web-based UI may include the button, however, the button may be displayed in a non-selectable state. In other aspects of the disclosure, instead of impacting the login process, the CPU 200 may disable a web-based UI from creating an analysis plan for a diagnostic analysis.

In another aspect of the disclosure, instead of disabling a selection of diagnostic mode analysis when a sequencing apparatus is unqualified, the CPU 200 may cause a web-based UI to display a warning when the sequencing apparatus is selected when creating the analysis plan. The web-based UI may be a pop-up window with a button or selection tool to select the sequencing apparatus even though the sequencing apparatus is unqualified.

When the CPU 200 determines that both the model number and the software (and versions) match with the approved information in the working memory ("Y" at S604), the CPU 200 then determines whether the appropriate qualification material was used. The CPU 200 compares an identifier of the qualification material used to generate the sequencing apparatus report 318 (identified in the report) with the qualification material 326 stored in the working memory 208 at S610. When the CPU 200 determines that the appropriate material was not used, e.g., no match ("N" at S610), the CPU determines that the sequencing apparatus is unqualified (or remains unqualified) and S606-S610 are performed. S606-S610 were described above and will not be described again.

When the CPU 200 determines that the appropriate material was used, e.g., a match ("Y" at S610), the CPU 200 then examines the quality score for the sequencing run. For example, a Q30 score may be used to determine qualification. The examination may be based on other statistical parameters or quality metrics and the disclosure is not limited to only using a quality score. For example, qualification may also be determined by total yield of amplified nucleic acid for the sequencing run.

The quality score for a sequencing run is generated by the sequencing apparatus 10 and contained in the sequencing apparatus report 318. At S614, the CPU 200 compares the quality score (or any other statistical parameter) with a preset threshold. The preset threshold is stored in memory 205. For example, the preset threshold may be between 70% and 80%, such as 70%, 71%, 72%, 73%, 74%, 75%, 76%, 77%, 78%, 79% or 80%. Other preset threshold values may be used and the disclosure is not limited to the disclosed threshold.

When the CPU 200 determines that the statistical value, e.g., Q30, is less than the preset threshold ("Y" at S614), the CPU 200 determines that the sequencing apparatus is unqualified (or remains unqualified) and S606-S610 are performed. S606-S610 were described above and will not be described again.

When the CPU 200 determines that the statistical value, e.g., Q30, is greater than or equal to the preset threshold ("N" at S614), the CPU 200 determines that the sequencing apparatus is qualified (or remains qualified). At S616, the CPU 200 sets the status of the sequencing apparatus that executed the sequencing run to qualified. The CPU 200 updates the status information for the sequencing apparatus (stored in 310) to qualified. The CPU 200 also updates the run history 314.

In embodiments, both Q30 score and total yield of amplified nucleic acid are used to determine qualification. When both are used, the preset threshold for Q30 score is between 70% and 80%, such as 75%, and the preset threshold for total yield is between 85% and 95%, such as 90%. In one embodiment, a sequencing run is qualified when CPU 200 determines Q30 is greater or equal to the preset threshold of 75% and total yield is greater or equal than the preset threshold of 90%.

At S618, the CPU 200 causes a notification to be displayed on a web-based UI that the sequencing apparatus is qualified. In an aspect of the disclosure, if the user is still logged into the system 1, the web-based UI is updated with the change in status. Afterwards, the CPU 200 returns to S512.

A similar qualification analysis is performed for the reagents when reagent only is selected by the user. For example, S602, S604 and S610 are the same. When the model number and software is approved and the qualification material is appropriate ("Y" at S604 and S610), the CPU 200 checks the expiration date for the reagent(s) used in the sequencing run at S628. The CPU 200 obtains the lot numbers used in the sequencing run from the stored sequencing apparatus report 318 and retrieves the reagent information for the corresponding reagent from working memory 208 (stored in reagents 312). At S630, the CPU 200 compares the current date with the expiration date. The CPU 200 has a clock with the date. When the current date is later than the expiration date, the reagent has expired. When it is determined that the reagent expired ("Y" at S630), the CPU 200 moves to S622.

Otherwise, the CPU 200 examines the quality score (a statistical parameter) for the sequencing run in the same manner as described above for S612 and 614.

When the CPU 200 determines that the statistical value, e.g., Q30, is greater than or equal to the preset threshold, the CPU 200 determines that the reagent is qualified (or remains qualified). At S632, the CPU 200 sets the status of the reagent(s) that were used in the sequencing run to qualified. The CPU 200 updates the status information for the reagent(s) (stored in 312) to qualified. The CPU 200 also updates the run history 314.

At S618, the CPU 200 causes a notification to be displayed on a web-based UI that the reagent(s) is qualified. In an aspect of the disclosure, if the user is still logged into the system 1, the web-based UI is updated with the change in status. Afterwards, the CPU 200 returns to S512.

When the model number or the software is not approved or the qualification material is not appropriate or the reagent expired or the quality score is less than the preset threshold ("N" at S604 and S610, "Y" at S630 and S614), the CPU sets the status for the reagent(s) to unqualified (or remains unqualified) at S622. The CPU 200 updates the status information for the reagent(s) (stored in 312) to unqualified. The CPU 200 also updates the run history 314.

At S624, the CPU 200 causes a notification to be displayed on a web-based UI that the reagent(s) is unqualified. In an aspect of the disclosure, if the user is still logged into the system 1, the web-based UI is updated with the change in status.

In an aspect of the disclosure, when a reagent is unqualified for whatever reason, the server 30 may prevent a diagnostic analysis using the reagent. At S626, the CPU 200 may remove an unqualified reagent from a list of available reagents to be included in an analysis plan. In an aspect of the disclosure, the web-based UI for created an analysis plan may include drop down windows with a list of available reagents. The list may be generated with information in the reagent 312 (for only qualified reagents). Therefore, in accordance with aspects of the disclosure, the user may be prevented from selecting an unqualified reagent for an analysis plan.

In other aspects of the disclosure, when it is determined that the reagent expired, the CPU 200 may cause a pop-up window to be displayed, as a web-based UI, which indicates that the reagent expired with an instruction to discard the reagent. The pop-up window may have a confirmation button or an ignore button.

When the user designates a sequencing run to qualify both the sequencing apparatus and the reagent, both sets of analyses are performed and will not be described again. Where functions are the same for the reagent and sequencing apparatus, the function may be performed only once. For example, S602 would be performed once when both the sequencing apparatus and reagent is selected for qualification.

Returning to FIG. 5, when the CPU 200 determines that the user did not designate a sequencing run as a qualification run ("N" at S510) and an analysis plan 316 is received for a sequencing run, the CPU 200 determine a mode for the analysis at S514. In an aspect of the disclosure, the determination may be based on the login mode, e.g., whether the user selected diagnostic or research at login. In other aspects of the disclosure, the determination is based on information in the analysis plan.

At S516, the CPU 200 determines whether the analysis mode is a diagnostic mode. When it is determined that the mode is research mode, the CPU 200 performs the analysis as set forth in the analysis plan 316, generates research analysis report(s) for cases included in the analysis plan and a complete run report and stores the same in the working memory 208 (in 322). A research analysis report is created for each case in the analysis plan. At S518, the CPU 200 allows access to the research analysis report(s) and the complete run report even if the sequencing run was executed on a sequencing apparatus that was unqualified or using reagents which are unqualified. In an aspect of the disclosure, the CPU 200 updates at least case history 328 with an available report status. The case history may also include the generated research analysis reports, respectively, for each case in the analysis plan. In an aspect of the disclosure, the analysis plan is updated with the complete run report in the working memory. In an aspect of the disclosure, the identifier for the storage location may be included. In an aspect of the disclosure, if the user is still logged into the system 1, the web-based UIs are updated with the change in status for the generated reports. In an aspect of the disclosure, if the user has logged out of the system 1, a subsequent login would result in updated web-based UIs for the Run Level server analysis reports, analysis plans and cases. In another aspect of the disclosure, a pop-up window may be displayed.

When it is determined that the mode is diagnostic mode, S700 occurs, and the CPU 200 executes the diagnostic analysis as set forth in the analysis plan and generates diagnostic analysis report(s) for each case in the analysis plan 316 and a complete run report for the sequencing run. The generated reports are stored in the work memory 208 (server analysis reports 322).

Figure 7:
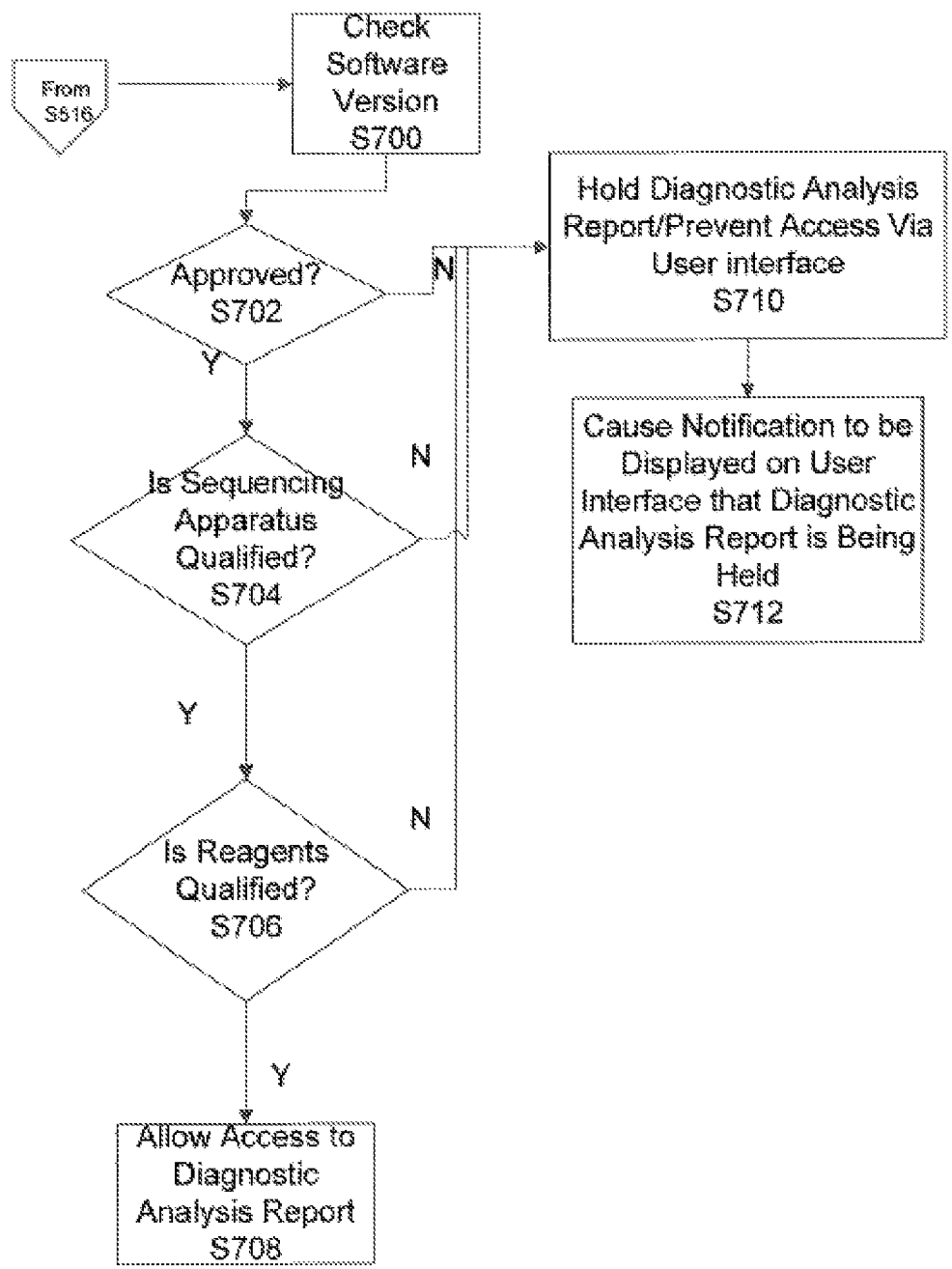
Figure 8:
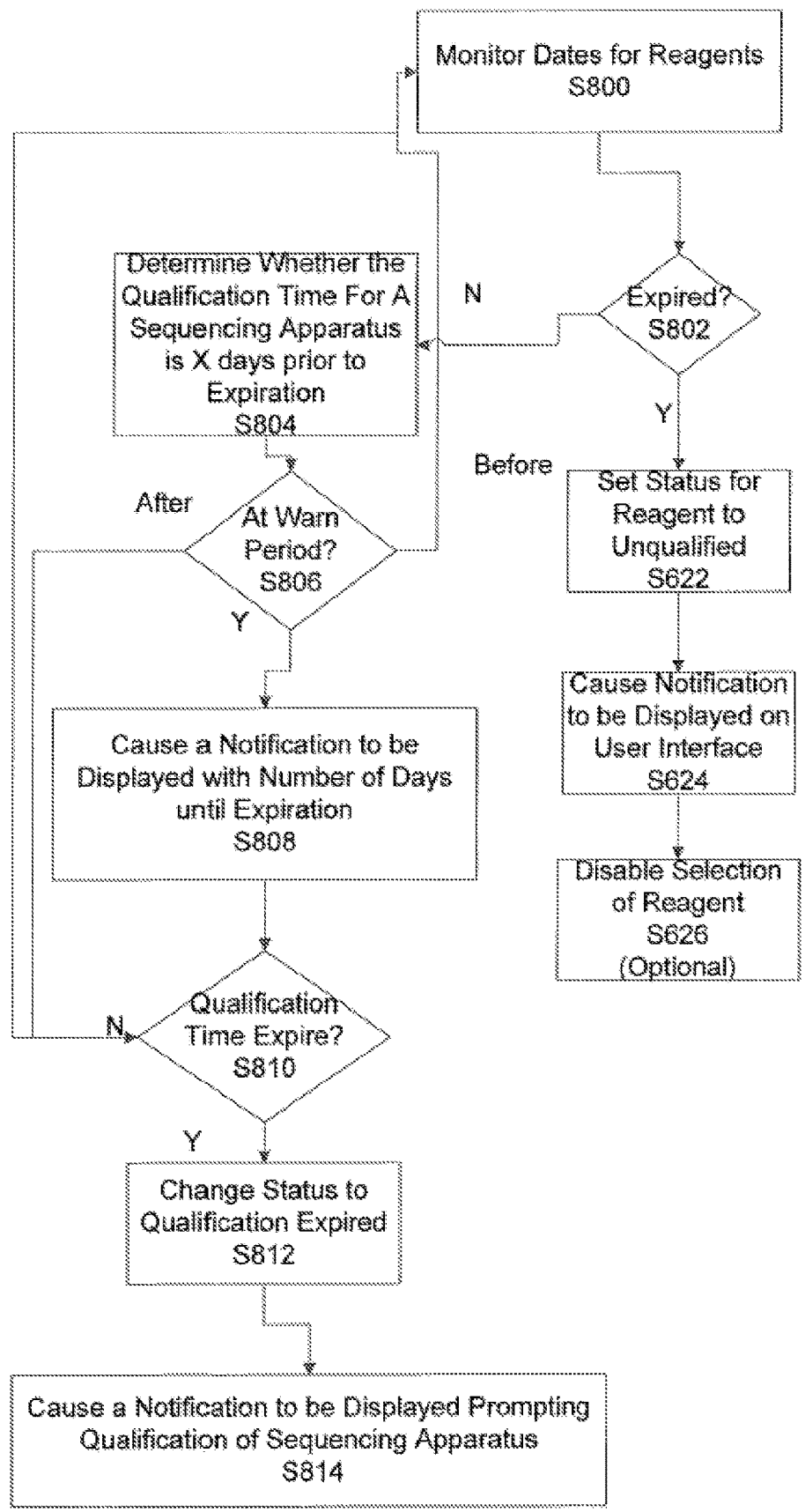

The CPU 200 also determines whether the diagnostic analysis reports or complete run report should be held or release for access. This determination is shown in FIG. 7. At S700, the CPU 200 checks the model number of the sequencing apparatus and the software (and versions) installed therein. The CPU 200 identifies the model number and software (and versions) installed in the sequencing apparatus that generated the sequencing apparatus report 318 for the sequencing run from the report 318. The CPU 200 also retrieves the model numbers and software 324 which is approved also stored in the working memory 208.

The CPU 200 compares the model number and software (and versions) installed in the sequencing apparatus with model numbers and software 324 which is approved (at S702) to determine whether the model and software (for the sequencing apparatus) is approved. When the either the model number or software is not approved, the generated diagnostic analysis reports are held in the server 30 and access to the same is prevented in S710 (will not be seen in a web-based UI). Held diagnostic analysis reports are marked as a status of 'held' in the working memory 208. When the server 30 receives a request for a web-based UI, the server 30 does not retrieve any reports mark "held". In another aspect of the disclosure, the complete run report may be also held in the server and access to the same is prevented.

When both the model number and software are approved ("Y" at S702), the CPU 200 determines whether the sequencing apparatus which generated the report is qualified at S704. The CPU examines the sequencing apparatus report 318 (for the sequencing run) for the identifier of the sequencing apparatus and retrieves the status stored in working memory 208 (in 310). When the status is unqualified or qualification expired or not tested ("N" at S704), the generated diagnostic analysis reports are held in the server 30 and access to the same is prevented in S710. Once again, in an aspect of the disclosure, the complete run report may be also held in the server and access to the same is prevented.

When the status for the sequencing apparatus that generated the sequencing apparatus report 318 is qualified ("Y" at S704), the CPU 200 determines whether the reagents used in the sequencing run are qualified at S706. The CPU examines the sequencing apparatus report 318 (for the sequencing run) for the identifier of the reagent(s) and retrieves the status for the same. When the status is unqualified or not tested ("N" at S706), the generated diagnostic analysis reports are held in the server 30 and access to the same is prevented in S710. Once again, in an aspect of the disclosure, the complete run report may be also held in the server and access to the same is prevented.

When the status for the reagents is qualified ("Y" at S706), access to the generated diagnostic analysis reports and the complete run record is allowed at S708. In an aspect of the disclosure, the CPU 200 looks at qualification for the sequencing apparatus and reagents at the time that the sequencing run is started. Therefore, the CPU 200 retrieves the start time from the sequencing apparatus report and compares the same with the qualification date and time for both the reagents and sequencing apparatus. Accordingly, there may be a case where a sequencing apparatus and reagent is qualified but after a sequencing run was started. In this aspect of the disclosure, a diagnostic analysis report may also be held. The complete run report may also be held in other aspects of the disclosure.

In an aspect of the disclosure, the CPU 200 updates at least the case history 328 with an available report status. In an aspect of the disclosure, the identifier for the storage location may be included. In an aspect of the disclosure, if the user is still logged into the system 1, the web-based UIs are updated with the change in status for the generated reports. In an aspect of the disclosure, if the user has logged out of the system 1, a subsequent login would result in updated web-based UIs. In another aspect of the disclosure, a pop-up window may be displayed.

When a diagnostic analysis report or a complete run record is being held, a notification of the status is caused to be displayed at S712. In an aspect of the disclosure, if the user is still logged into the system 1, a web-based UI is updated with the change in status for the diagnostic analysis report. In an aspect of the disclosure, the word held may be display in a preset color, such as red. In an aspect of the disclosure, if the user has logged out of the system 1, a subsequent login would result in updated web-based UIs indicating that the diagnostic analysis report or a complete run record is held. In another aspect of the disclosure, a pop-up window may be displayed.

As described above, a run may be designed as a qualification run and also designated for analysis by creating an analysis plan 316. In this case, the qualification analysis may occur first. When the reagent and/or sequencing apparatus is qualified based on the qualification run, the analysis, as set forth in the analysis plan 316, may be executed. For example, after S618 the CPU 200 determines whether the qualification run is also a sample run, e.g., an analysis plan is generated, at S512.

When it is determined that no analysis plan is generated, e.g., only a qualification run, the analysis of the sequencing run ends at S520, otherwise, the analysis proceeds to S514.

Once a sequencing apparatus 10 or a reagent is qualified (or even if the reagent is not qualified), the server 30 continues to monitor the status. For example, at S800, the CPU 200 monitors the expiration date of each of the registered reagents stored in the working memory (reagents 312). At S802, the CPU 200 determines whether any reagent(s) has expired. When a reagent expires ("Y" at S802), the CPU 200 executes S622-S626, which were described above and will not be described again.

When none of the reagents expired ("N" S802), the CPU 200 determines whether current date has reached the warning or notification date (S804), based on the monitoring in S800, for a sequencing apparatus. When the current date is equal to the warning date ("Y" at S806), the CPU 200 causes a notification to be displayed on a web-based UI at S808. In an aspect of the disclosure, the notification may be a pop-up window. When the current date is after the warn date ("After" at S806), the CPU 200 moves to S810 and determines whether any sequencing apparatus's qualification period is expired. The CPU 200 monitors the qualification period for each sequencing apparatus 10 registered in the working memory 208. The determination is based on the current date and the expiration date for the qualification period stored in a record for each sequencing apparatus (if qualified).

When the qualification time for a sequencing apparatus expires ("Y" at S810), the CPU 200 changes the status for the sequencing apparatus from qualified to qualification expired at S812. The CPU 200 updates the status in the working memory 208 (in 312). At S814, the CPU 200 causes a notification to be displayed on the client terminal 10. For example, the CPU 200 may cause a web-based UI to display a pop-up window indicating that the qualification expired and prompting the user to qualify the sequencing apparatus. In an aspect of the disclosure, the pop-up window may have a confirmation button. Additionally, in aspects of the disclosure, the web-based UI for the sequencing apparatuses will include the updated status. The updated status may be in a specific color (such as red).

When the current date is before all warning dates, the CPU 200 moves to S800.

In accordance with aspects of the disclosure, when software or a version of software installed is the sequencing apparatus is updated, the sequencing apparatus is declared to be unqualified. In an aspect of the disclosure, an administrator may log into the system 1 and via a web-based UI indicate that new software has been installed into a sequencing apparatus or new version of software has been installed. The indication will identify the sequencing apparatus. In response to receipt via the network interface 210, the CPU 200 will update the status for the sequencing apparatus in working memory (in 310) to unqualified if previously qualified. In an aspect of the disclosure, the CPU 200 may cause a web-based UI to have a confirmation screen or box for confirming the update (as the update may impact the status of diagnostic analysis reports). For example, the confirmation screen may indicate "this action will cause the sequencer to become unqualified" (sequencing apparatus) and that the sequencing apparatus may remain unqualified until a successful qualification run is performed. Other phrases may be used and the wording is not limited to the wording described herein.

Subsequently, the CPU 200 may cause a notification to be displayed on the client terminal 10. For example, the CPU 200 may cause the web-based UI to display a pop-up window indicating that the sequencing apparatus is unqualified and prompting the user to qualify the sequencing apparatus. In an aspect of the disclosure, the pop-up window may have a confirmation button. Additionally, in aspects of the disclosure, the web-based UI for the sequencing apparatuses will include the updated status. The updated status may be in a specific color (such as red).

In accordance with aspects of the disclosure, in addition to software and version information being entered for the sequencing apparatus as described in the previous two paragraph, hardware updates may be entered and cause the same result in the status, e.g., status set to unqualified for the sequencing apparatus if previously qualified.

In accordance with aspects of the disclosure, an administrator may log into the system 1 (with USER ID and passcode) and release held diagnostic analysis reports. In an aspect of the disclosure, a troubleshooting procedure will be completed prior to releasing the held diagnostic analysis report(s). In an aspect of the disclosure, an administrator web-based UI may include a list of held diagnostic analysis reports with a corresponding selection tool. For example, the selection tool may be a button or a check box. When the administrator indicates that a diagnostic analysis report is to be released by using the tool, the instruction is received by the server 30 via the network interface 210. In an aspect of the disclosure, the CPU 200 may cause the web-based UI to display a window requiring the administrator to reenter a passcode. The CPU 200 makes the report released by the administrator available for access by the web-based UI. For example, the CPU 200 updates the run history 314. The updated run history is used to create the web-based UI. In other aspects of the disclosure, a pop-up window may be displayed indicating a new diagnostic report is available.

In an aspect of the disclosure, there may be a situation where an administration changes a sequencing run from a qualification run, which impacts the holding of a diagnostic analysis report. For example, changing a qualification run may release held diagnostic analysis reports when the sequencing run failed qualification and/or either the sequencing apparatus and/or the reagents used are currently qualified. In this case, in an aspect of the disclosure, the CPU 200 may cause the web-based UI to display a pop-up window confirming the change in the qualification run with a selection tool such as a confirmation button or a cancel button. This pop-up window may also include working such as "reports that are now held will be released as a results of this action".

In an aspect of the disclosure, when a reagent used in a held diagnostic analysis report is qualified (after not being unqualified), the diagnostic analysis report is released.

In an aspect of the disclosure, quality metrics may be stored for purposes of tracking and trending the performance of sequencing apparatuses 10 and reagents over time. In this scenario, quality metrics would be captured for any diagnostic or research sequencing run in which the qualification material 326 has been added. These data would be trended to identify progressively degraded, but potentially still passing, quality. In the event that the system 1 detects a downward trend in quality, the user will be notified via the web-based UI that the sequencing apparatus 10 and/or reagent are potentially compromised. The user could then choose another sequencing apparatus or reagent lot for the next diagnostic or research run. Alternatively, the user could run a full qualification run on the apparatus 10 or reagent lot to verify performance before proceeding.

In another aspect of the disclosure, a central display may be disposed within a laboratory where the plurality of sequencing apparatuses 10 is located. The central display may display a dashboard showing all of the sequencing apparatuses and their corresponding statuses, and reagents and their corresponding statuses (including expiration date). Each status may be displayed in a specific color as described above. In this aspect of the disclosure, the central display may include a wireless communication interface configured to communicate with the server 30. When a status for a sequencing apparatus 10 or a reagent changes, the server 30 may transmit the changed status to the central display and the central display will display the updated status.

In another aspect of the disclosure, each sequencing apparatus may have a corresponding notification device positioned near the sequencing apparatus. The notification device may be a light indicator or a display panel. When the notification device is installed, by an authorized installer, the notification device is associated with the sequencing apparatus and registered. The server 30 in the working memory 208 will add the network address for the notification device. In other aspects of the disclosure, the notification device may be paired with the server 30. Once registered, the server may communicate any status information for the associated sequencing apparatus to the notification device for display. For example, when the sequencing apparatus is not unqualified, a light indicator may emit a red light and when the sequencing apparatus is qualified, the light indicator may emit a green light.

The colors described herein are examples and other colors may be used for the described indication.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

Although the invention has been described with reference to the above examples, it will be understood that modifications and variations are encompassed within the spirit and scope of the invention. Accordingly, the invention is limited only by the following claims.

What is claimed is:

1. A system comprising:
    a memory configured to store identifiers of sequencing apparatuses and associated statuses of the sequencing apparatuses, identifiers of reagents and associated statuses of the reagents, and identifiers of approved software for the sequencing apparatuses;
    a network interface configured to communicate with a sequencing apparatus and a client terminal; and
    a processor configured to:
        receive a report from the sequencing apparatus via the network interface for a sequencing run performed on the sequencing apparatus, wherein the report comprises an identifier of the sequencing apparatus, an identifier of a reagent used in the sequencing run, an identifier of software installed in the sequencing apparatus, and a result of the sequencing run;
        determine whether the sequencing run is designated as a qualification run based on a user designation in a user interface or an analysis plan;
        when it is determined that the sequencing run is designated as the qualification run, the processor is further configured to:
            compare the identifier of the software in the report with the identifiers of the approved software in the memory, wherein
                when there is no match between the identifier of the software in the report and the identifiers of the approved software in the memory, the software installed in the sequencing apparatus is determined to be not approved, and the associated status for the sequencing apparatus or the reagent is determined to be unqualified, and;
                when there is a match between the identifier of the software in the report and the identifiers of the approved software in the memory, the software installed in the sequencing apparatus is determined to be approved, and the result of the sequencing run is examined to determine whether the sequencing apparatus or the reagent is qualified; and
            update the associated status in the memory for at least one of the sequencing apparatus and the reagent in response to examination;
        when it is determined that at least one of the sequencing apparatus and the reagent is qualified, the processor is further configured to transmit via the network interface a notification to the client terminal that (i) the sequencing apparatus is qualified when the sequencing apparatus is determined to be qualified, and (ii) the reagent is qualified when the reagent is determined to be qualified; and
        when it is determined that the at least one of the sequencing apparatus and the reagent is unqualified, the processor is further configured to:
            (i) transmit via the network interface a notification to the client terminal that the sequencing apparatus is unqualified when the sequencing apparatus is determined to be unqualified, and
            cause a selection of a diagnostic mode analysis using the sequencing apparatus to be disabled on the client terminal; and
            (ii) transmit via the network interface a notification to the client terminal that the reagent is unqualified when the reagent is determined to be unqualified, and
            update the analysis plan by removing the reagent from a list of available reagents to be included in the analysis plan from a location where the analysis plan is stored.

2. The system of claim 1, wherein the processor is further configured to receive a designation of the sequencing run as the qualification run via the network interface from the client terminal, the designation including whether the qualification run is to qualify the sequencing apparatus, the reagent or both the sequencing apparatus and the reagent.

3. The system of claim 1, when it is determined that both the sequencing apparatus and the reagent are qualified, the processor is further configured to determine whether the sequencing run is designated as a sample run.

4. The system of claim 3, when the sequencing run is designated as a sample run, the processor is further configured to determine whether an analysis that is requested is in a diagnostic mode based on the analysis plan or a login mode, wherein when it is determined that the analysis is in the diagnostic mode, the processor is further configured to:
    determine whether the software installed in the sequencing apparatus is approved software by comparing the identifier of the software in the report with the identifiers in the memory;
    determine whether the sequencing apparatus is qualified based on the associated status stored in the memory for the sequencing apparatus identified in the report; and determine whether the reagent used in the sequencing run is qualified based on the associated status stored in the memory for the reagent identified in the report.

5. The system of claim 4, wherein:
when the software installed in the sequencing apparatus is approved and both the sequencing apparatus and the reagent is qualified, the processor is configured to enable access to a diagnostic analysis report by the client terminal, wherein the diagnostic analysis report was generated by the sequencing apparatus using the reagent, and wherein the enabling access allows the diagnostic analysis report to be displayed by a user interface in the client terminal, and
when the software installed in the sequencing apparatus is not approved or when the sequencing apparatus or the reagent is not qualified, the processor is further configured to disable a creation of an analysis plan in the diagnostic mode using the sequencing apparatus or the reagent.

6. The system of claim 1, wherein an expiration date of a reagent is stored in the memory in association with an identifier of the reagent, respectively, and wherein the processor is further configured to change a status of a reagent to unqualified when a current date is after the expiration date for the reagent.

7. The system of claim 4, wherein when the software installed in the sequencing apparatus is not approved or when the sequencing apparatus or the reagent is not qualified, the processor is further configured to transmit via the network interface a notification to the client terminal that a diagnostic analysis report is being held.

8. The system of claim 7, wherein the processor is further configured to transmit via the network interface a notification to the client terminal that the software installed in the sequencing apparatus is not approved or that at least one of the sequencing apparatus and the reagent is not qualified.

9. The system of claim 1, wherein the result of the sequencing run is examined based on a quality score for the sequencing run, wherein the quality score is generated by the sequencing apparatus and contained in the report.

10. The system of claim 7, wherein the processor is further configured to:
receive via the network interface an instruction to release the held diagnostic analysis report; and
cause a window for reentering an authorization passcode to be displayed on the client terminal via the network interface, wherein the instruction comprises the authorization passcode.

11. The system of claim 1, further comprising a web-based user interface (web-based UI) capable of being displayed on the client terminal, wherein the web- based UI is configured to create an analysis plan for the sequencing run, set the sequencing run as the qualification run to qualify the sequencing apparatus and/or the reagent, and/or display a diagnostic analysis report.

12. The system of claim 11, wherein the web-based UI is configured to display (i) available sequencing apparatuses, (ii) a qualification status of each sequencing apparatus, and/or a time remaining until the qualification expires, or (iii) both (i) and (ii), wherein the web-based UI has a selection window enabling a selection of a sequencing apparatus and/or a reagent.

13. The system of claim 1, further comprising the sequencing apparatus configured to perform the sequence run and generate the report transmitted to the processor via the network interface.

14. The system of claim 1, wherein the associated statuses of the sequencing apparatuses comprise qualified, unqualified, or qualification expired, wherein when the sequencing apparatus is determined to be qualified, a date of qualification is stored in the memory in association with the identifier of the qualified sequencing apparatus and wherein a sequencing apparatus remains qualified for a period of time as a qualification period, and wherein the processor is further configured to determine when the period of time expires and when it is determined that the period of time expires, the processor is configured to change the associated status of the sequencing apparatus to qualification expired.

15. The system of claim 14, wherein the processor is further configured to transmit via the network interface a notification to the client terminal that the qualification period is expiring, the transmitting occurring at time prior to the period of time expiring, the notification is configured to cause a prompt to be displayed on a user interface displayable on the client terminal, the prompt indicating that the sequencing apparatus should be run as a qualification run to qualify the sequencing apparatus.

16. The system of claim 14, wherein the processor is further configured to receive a setting of the period of time and the time prior to the period of time expiring via the network interface, the setting comprising an authorization passcode.

17. The system of claim 11, wherein the processor is further configured to receive information regarding updates to hardware of a sequencing apparatus, the information being input into the user interface in the client terminal and communicated via the network interface, and wherein in response to receiving the information, the processor is configured to change the associated status of the sequencing apparatus to unqualified.

18. The system of claim 17, wherein when the associated status of the sequencing apparatus changes, the processor is configured to transmit via the network interface a notification to the client terminal, the notification is configured to cause a prompt to be displayed on the user interface, the prompt indicating that a qualification run should occur to qualify the sequencing apparatus.

19. The system of claim 1, wherein the processor is further configured to determine whether an analysis that is requested is in a research mode, wherein when it is determined that the analysis is in the research mode, the processor is configured to enable access by the client terminal to a research analysis report generated by the processor from the report, the enabling access allowing the research analysis report to be displayed by a user interface in the client terminal, even if the sequencing apparatus is not qualified or the reagent used is not qualified.

20. The system of claim 1, wherein the memory further comprises identifiers of qualification materials, and wherein the report further comprises an identifier of a qualification material used to generate the report, wherein when the identifier of the qualification material used to generate the report does not match the identifiers of the qualification materials stored in the memory, the processor is configured to determine that the sequencing apparatus is not qualified.

21. A system comprising:
a memory configured to store identifiers of diagnostic apparatuses and associated statuses of the diagnostic apparatuses, identifiers of reagents and associated statuses of the reagents, and identifiers of approved software for the diagnostic apparatuses;

a diagnostic apparatus configured to perform a diagnostic test with a testing parameter and generate a report for the diagnostic test;

a network interface configured to communicate with the diagnostic apparatus and a client terminal; and one or more processors; and one or more computer-readable media storing instructions which, when executed by the one or more processors, cause the system to perform operations comprising:

receiving the report from the diagnostic apparatus via the network interface, wherein the report comprises an identifier of the diagnostic apparatus, an identifier of a reagent used in the testing parameter, an identifier of software installed in the diagnostic apparatus, and a result of the testing parameter;

determining whether the testing parameter is designated as a qualification run;

when it is determined that the testing parameter is designated as the qualification run, a first subprocess comprising following operations is performed:

comparing the identifier of the software in the report with the identifiers of the approved software in the memory, wherein when there is no match between the identifier of the software in the report and the identifiers of the approved software in the memory, the software installed in the diagnostic apparatus is determined to be not approved, and the associated status for the diagnostic apparatus or the reagent is determined to be unqualified, and when there is a match between the identifier of the software in the report and the identifiers of the approved software in the memory, the software installed in the diagnostic apparatus is determined to be approved, and the result of the testing parameter is examined to determine whether the diagnostic apparatus or the reagent is qualified; and update the associated status in the memory for at least one of the diagnostic apparatus and the reagent in response to examination;

when it is determined that at least one of the diagnostic apparatus and the reagent is qualified, a second subprocess comprising following operations is performed:

transmitting via the network interface a notification to the client terminal that (i) the diagnostic apparatus is qualified when the diagnostic apparatus is determined to be qualified, and (ii) the reagent is qualified when the reagent is determined to be qualified; and when it is determined that the at least one of the diagnostic apparatus and the reagent is unqualified, a third subprocess comprising following operations is performed:

(i) transmitting via the network interface a notification to the client terminal that the diagnostic apparatus is unqualified when the diagnostic apparatus is determined to be unqualified, and causing a selection of a diagnostic mode analysis using the diagnostic apparatus to be disabled on the client terminal; and (ii) transmitting via the network interface a notification to the client terminal that the reagent is unqualified when the reagent is determined to be unqualified, and update the testing parameter by removing the reagent from a list of available reagents to be included in the testing parameter from a location where the testing parameter is stored.

* * * * *